United States Patent Office

3,630,910

Patented Dec. 28, 1971

3,630,910

MAGNETIC RECORDING MEDIUM

Goro Akashi and Masaaki Fujiyama, Kanagawa, Japan, assignors to Fuji Shashin Film Kabushiki Kaisha, Kanagawa, Japan No Drawing. Filed Jan. 12, 1968, Ser. No. 697,329
Claims priority, application Japan, Jan. 12, 1967, 42/2,355
Int. Cl. H01f *1/26*
U.S. Cl. 252—62.54 8 Claims

ABSTRACT OF THE DISCLOSURE

By incorporating fine abrasive particles in a magnetic layer containing ferromagnetic powder in a binder on a magnetic recording medium, the surface of a recording and reproducing head can be maintained in a smooth condition. The abrasive particles may also form the outer surface of the magnetic layer.

BACKGROUND OF THE INVENTION

Field of the invention

The present invention relates to a magnetic recording medium having a magnetic recording layer containing ferromagnetic powder dispersed in a binder therein, such as video-tape, memory-tape, audio-tape or the like, and in particular to a magnetic recording medium which maintains the surface of a recording and reproducing head in a smooth condition.

Description of the prior art

A great amount of research has been done in the magnetic recording media art to reduce the wear of the magnetic recording and reproducing head (hereinafter referred to as the head) and to lengthen the life span of the head. Recently due to improvements in the signal-to-noise ratio and frequency characteristics of tapes, it has been possible to reduce the size of ferromagnetic particles utilized in tapes and to smooth the surface of the magnetic layers utilized in these tapes. Binders and lubricants have also been improved. These factors enabled wear on the head to be remarkably reduced, and magnetic recording mediums having excellent signal-to-noise ratios and frequency characteristics with very low wear on the head have been produced.

Though the above discussed factors were initially considered desirable, a problem developed. While wear of the head was reduced, the following disadvantages appeared:

(1) Since the head was not worn away as much by the "improved" tapes, the surface of the head was round to oxidize due to the heat produced by the high speed contact of the head with the surface of the magnetic layer. The surface of the head is also subject to chemical reactions with the binder ingredients or any decomposition products formed, which deteriorates the recording and reproducing characteristics of the head;

(2) If the surface of the head receives a sharp scratch due to any hard substance adhering to the surface of the magnetic layer, it is difficult to smooth the head, and the signal-to-noise ratio is lowered.

SUMMARY OF THE INVENTION

In order to eliminate the above disadvantages, it was found that by mixing abrasive particles into the magnetic layer, the wear of the head can be controlled to any desired degree. Thus, the surface of the head is always maintained smooth, thereby providing a high signal-to-noise ratio and excellent frequency characteristics.

Without the use of applicants' novel invention, it was found that if the size of the ferromagnetic particles was increased or the surface of the magnetic layer was grained to produce larger wearing of the head, the wear of the head may be made to the desired extent, but the sensitivity, signal-to-noise ratio and frequency characteristics which are necessary in magnetic recording media are lowered. In addition, if the wear of the head is extremely small the surface of the head will still oxidize, chemically deteriorate and become rough as described above, thereby lowering the signal-to-noise ratio in proportion to the time the head is used.

To obviate these disadvantages, it becomes necessary to regularly polish the surface of the head, which results in approximately the same wear of the head as described hereinbefore, but which requires a large amount of additional labor.

A magnetic recording medium produced in accordance with the present invention contains fine particles of magnetic material, which have negligible affect on the head. Thus, the surface of the head is not scratched and the signal-to-noise ratio is maintained high. Furthermore, the recording medium contains abrasive particles which wear away the head to a desirable extent, thereby maintaining the surface of the head fine at all times.

DESCRIPTION OF THE PREFERRED EMBODIMENTS

The following examples are set forth to enable one skilled in the art to appreciate specific embodiments of the invention, but are not to be considered limiting.

EXAMPLE 1

A coating liquid composed of the following ingredients was prepared, coated on a 25$\mu$ thick polyethyleneterephthalate base and dried so that the thickness of said coated layer would be 10$\mu$. This was made into a video-tape by calendering with a super calender. This tape was entitled "type."

| | Parts by wt. |
|---|---|
| $\gamma$-$Fe_2O_3$ (sizes: 0.3$\mu$ x 0.05$\mu$ x 0.05$\mu$) | 300 |
| Copolymer of vinyl chloride and vinyl acetate | 40 |
| Epoxide resin | 30 |
| Polyamide resin (liquid) | 30 |
| Antistatic material (anion series) | 10 |
| Oleic acid | 5 |
| Methylethyl ketone | 300 |
| Isopropyl alcohol | 50 |
| Toluene | 300 |

Eight additional tapes were formed as above, but with the addition of one of the following abrasives to the "type" composition:

| Tape No. | Abrasive metal | Particle size | Amount of abrasive incorporated, parts by weight |
|---|---|---|---|
| 1 | $Cr_2O_3$ | 0.5$\mu$ | 10 |
| 2 | $Cr_2O_3$ | 1.5$\mu$ | 10 |
| 3 | $Cr_2O_3$ | 1.5$\mu$ | 50 |
| 4 | $Cr_3O_3$ | 1.5$\mu$ | 100 |
| 5 | $Al_2O_3$ | 1$\mu$ | 50 |
| 6 | SiC | 0.8$\mu$ | 50 |
| 7 | Garnet | 1.2$\mu$ | 50 |
| 8 | $SiO_2$ | 0.7$\mu$ | 70 |

A comparison of the signal-to-noise ratios and wear on the head after contacting the head with these tapes for 20 hrs. (continuously) in a video-tape recorder is shown in Table 1.

TABLE 1

| Type (after the head was polished | Initial S/N ratio, db 44db | S/N ratio after 20 hrs., db 39 db (44 db) | Variation of S/N ratio by deterioration of the head, db −5 db (0 db) | Wear of the head, 0.5 ($3\mu$) |
|---|---|---|---|---|
| #1 | 44 | 43.5 | −0.5 | $1\mu$ |
| #2 | 44 | 44 | 0 | $1.5\mu$ |
| #3 | 44 | 44.5 | +0.5 | $3\mu$ |
| #4 | 44 | 44.5 | +0.5 | $5\mu$ |
| #5 | 43 | 43 | 0 | $2.5\mu$ |
| #6 | 44 | 44 | 0 | $3.5\mu$ |
| #7 | 43.5 | 43 | −0.5 | $3\mu$ |
| #8 | 44 | 43.5 | −0.5 | $3\mu$ |
| Reference | 40 | 40 | 8 | $3.5\mu$ |

It is apparent from Table 1 that though the wear of the head caused by the "type" tape is as little as $0.5\mu$, the head is deteriorated and the signal-to-noise was lowered as much as 5 db. This means that the "type" tape cannot, as a practical matter, be put to use.

When the head was polished in order to recover the signal-to-noise ratio (after continuous usage with the "type" tape), the ratio was recovered up to 44 db, but the wear of the head was still as much as $3\mu$. Thus, although it may be possible to reduce the wear of the head for recovering the signal-to-noise ratio, but it requires a large amount of labor, and it is extremely difficult for general users.

However, with each of the tapes, (No. 1 to No. 8) produced in accordance with the present invention, the signal-to-noise was not deteriorated and the surface of the head was maintained in a smooth condition.

A sample tape containing ferromagnetic particles (whose size was $1\mu$ x $0.15\mu$ x $0.15\mu$) was provided with a slightly grained surface so that the wear of the head would be about $35\mu$. In this case, the signal-to-noise ratio was not lowered, however, it was initially about 40 db, which is greatly inferior to the signal-to-noise ratio of a tape produced in accordance with the present invention.

As is apparent from the above example, a magnetic recording medium produced in accordance with the present invention is advantageous in that the head is not deteriorated, even under conditions of long time use, though fine particles of magnetic material are utilized. In addition, the recording medium has a smooth surface so that a very high signal-to-noise ratio is realized.

EXAMPLE 2

After coating a magnetic layer of the same composition as in Example 1 to a thickness of $6\mu$ on a $25\mu$ thick polyethylene terephthalate base, the coating liquids of tapes No. 1–No. 8 in Example 1 were coated thereon to a thickness of $4\mu$. Processing after coating was the same as that used in Example 1.

In this case, the results obtained were identical with those of Example 1, and it was found that the abrasives worked well even if they were added only to the surface of the tape.

As the abrasive particles used in accordance with the present invention, powdered material having a hardness of greater than about 6 in the Mohs' hardness scale is generally used. Alundum, Carborundum, chromium (III) oxide, garnet, silica and the like, as described above, are to be taken as only representative of the large class of materials useful, it being understood that the primary criteria for selection is hardness and compatibility in the environment contemplated.

As the binder, any of the polyurethane series, urea resin series, melamine resin series, phenol resin series, nitrocellulose series and the like have been utilized, and the results are about the same as that in the preceding examples. Any compatible resins may be used, as the resins recited are shown merely to enable one skilled in the art to utilize a resin compatible with the proposed environment.

If the size of the abrasive material is too large, the surface of the magnetic layer becomes rough thereby deteriorating the signal-to-noise ratio and frequency characteristics. In addition, the head gets some stratches. Therefore, it is desirable that the size of the abrasives be less than about $4\mu$ although larger particles may be operable in some instances.

Generally, with the smaller abrasive sizes, it is necessary that a greater amount of the abrasive material be mixed into the magnetic recording medium.

As the ferromagnetic material, $\gamma$-$Fe_2O_3$, $Fe_3O_4$, $CrO_2$, cobalt ferrite, Ba-ferrite, Fe-Co alloy, Fe-Co-Ni alloy Fe-Co-Cu alloy are generally employed. However, one skilled in the art will appreciate that any other compatible ferromagnetic materials may be utilized.

The invention has been described in detail with particular reference to preferred embodiments thereof, but it will be understood that variations and modifications can be effected within the spirit and scope of the invention as described above and defined in the appended claims.

We claim:

1. A magnetic recording medium having a magnetic recording layer containing ferromagnetic powders dispersed in a synthetic resin binder, wherein abrasive particles of a size smaller than about $4\mu$ are present in an amount of from 10 to 100 parts by weight, based on the weight of 100 parts of said binder, wherein the Mohs' hardness of said abrasive particles is higher than about 6.

2. A magnetic recording medium as defined in claim 1 having a plurality of said magnetic recording layers with said abrasive particles being present only in the outer layer thereof.

3. A magnetic recording medium as defined in claim 1 wherein said binder is selected from the group consisting of polyurethane-type resins, urea-type resins, melamine-type resins, phenol-type resins and nitro-cellulose-type resins.

4. A magnetic recording medium as defined in claim 1 wherein said abrasive material is selected from the group consisting of alundum, Carborundum, chromium (III) oxide, garnet and silica.

5. A magnetic recording medium defined in claim 1 wherein said ferromagnetic powder is selected from the group consisting of $\gamma$-$Fe_2O_3$, $Fe_3O_4$, $CrO_2$, cobalt ferrite, barium ferrite, Fe-Co alloy, Fe-Co-Ni alloy and Fe-Co-Cu alloy.

6. A magnetic recording medium having a magnetic recording layer containing a ferromagnetic powder selected from group consisting of $\gamma$-$Fe_2O_3$, $Fe_3O_4$, $CrO_2$, cobalt ferrite, barium ferrite, Fe-Co alloy, Fe-Co-Ni alloy and Fe-Co-Cu alloy, dispersed in a synthetic resin binder selected from the group consisting of polyurethane-type resins, urea-type resins, melamine-type resins, phenol-type resins and nitro-cellulose-type resins, wherein abrasive particles of a size smaller than about $4\mu$ are present in an amount of from 10 to 100 parts by weight, based on the weight of 100 parts of said binder, wherein the Mohs' hardness of said abrasive particles is higher than about 6.

7. A magnetic recording medium as in claim 6, wherein said abrasive material is selected from the group consisting of Alundum, Carborundum, chromium (III) oxide, garnet and silica.

8. A magnetic recording medium as in claim 7, wherein said magnetic recording medium has a plurality of said magnetic recording layers with said abrasive particles being present only in the outer layer thereof.

References Cited

UNITED STATES PATENTS

| | | | |
|---|---|---|---|
| 2,418,479 | 8/1947 | Pratt et al. | 252—62.54 |
| 2,857,879 | 10/1958 | Johnson | 117—240 |
| 3,149,996 | 9/1964 | Wagner et al. | 117—72 |
| 3,476,596 | 11/1969 | Carroll | 117—293 |

OTHER REFERENCES

Friedman et al.: I.B.M. Technical Disclosure Bulletin, vol. 9, No. 7, December 1966, p. 779.

Handbook of Chemistry and Physics, Chemical Rubber Co., Cleveland, Ohio, 46th edition, p. F–15.

TOBIAS E. LEVOW, Primary Examiner

A. P. DEMERS, Assistant Examiner

U.S. Cl. X.R.

117—234, 235, 239, 240